April 8, 1952  N. PERRY ET AL  2,592,328
ONION HARVESTING MACHINE
Filed Sept. 16, 1946  4 Sheets-Sheet 1
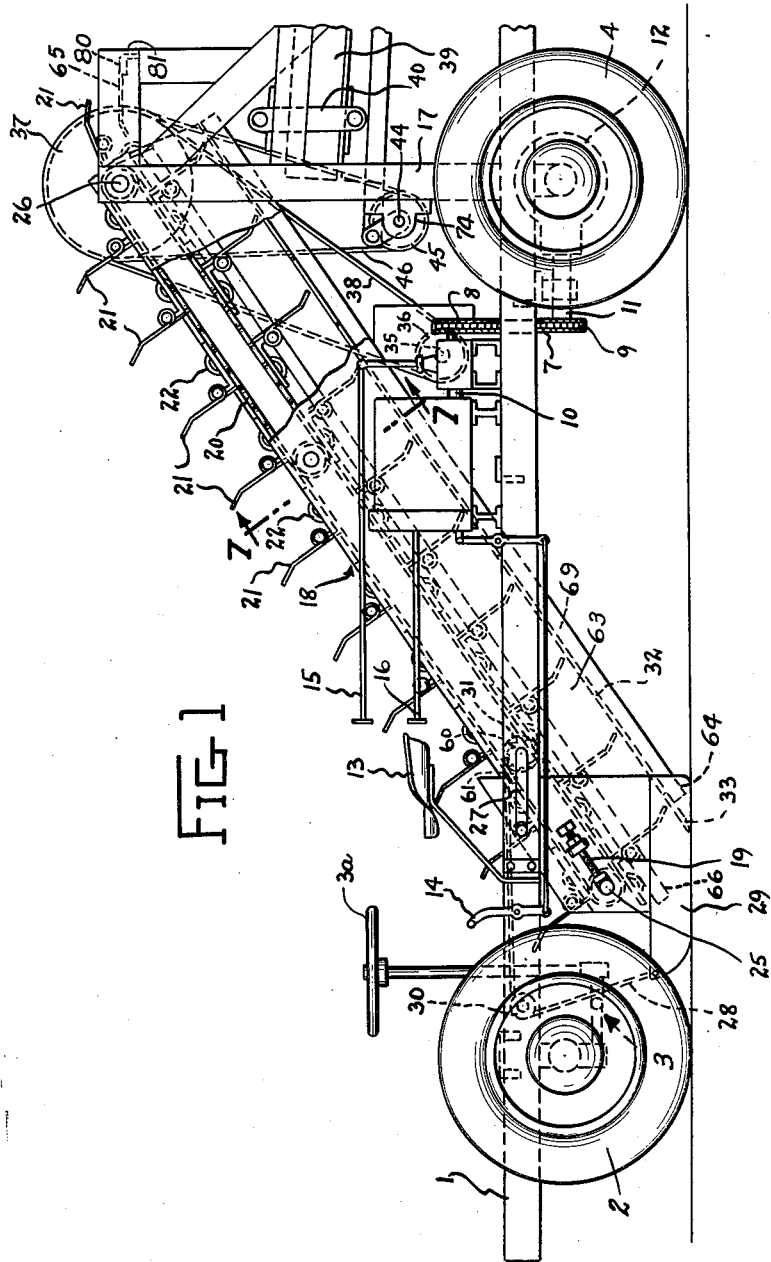
Inventors
NICK PERRY
SYLVESTER SCHULTZ
By Clarence A. O'Brien
and Harvey B. Jacobson
Attorneys

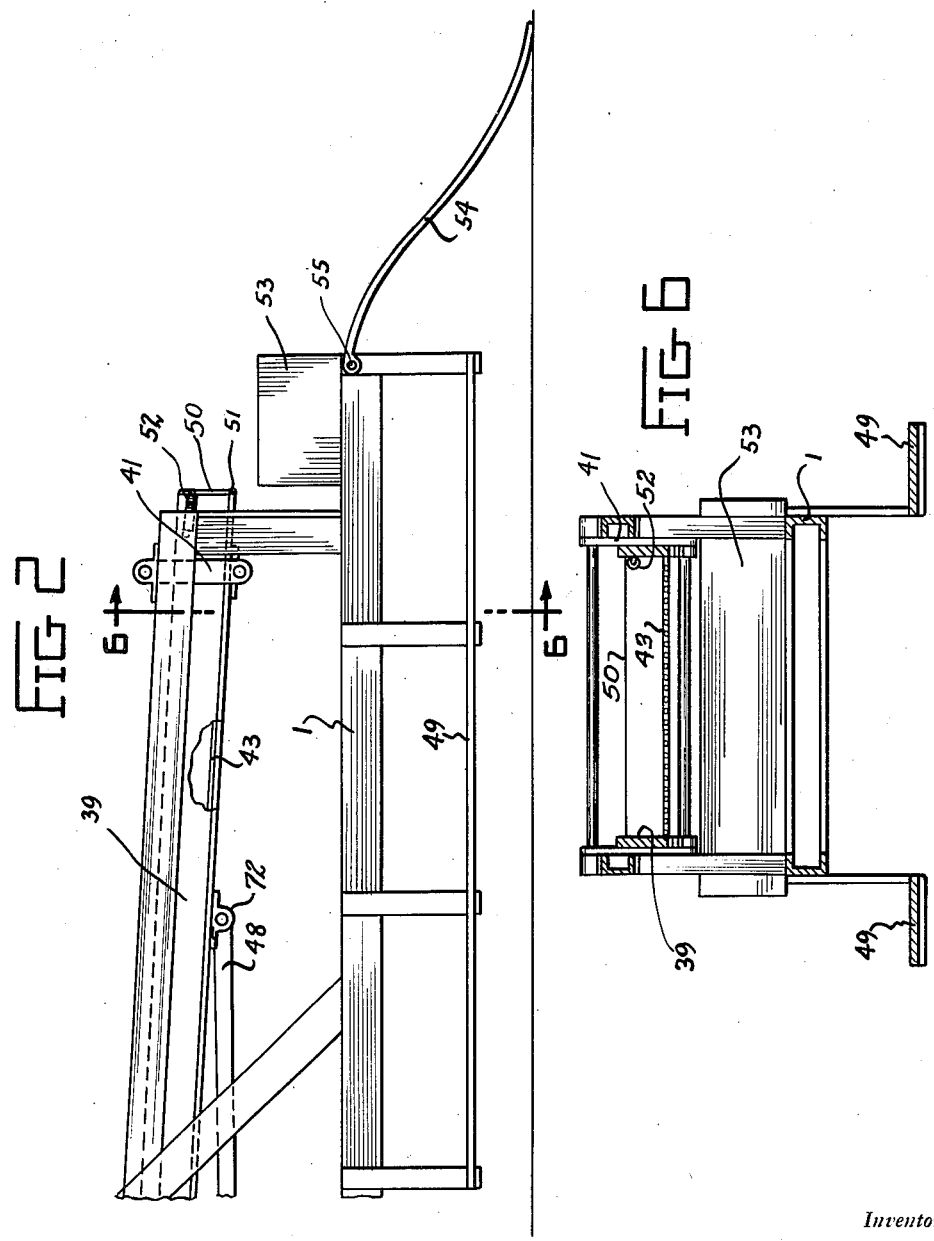

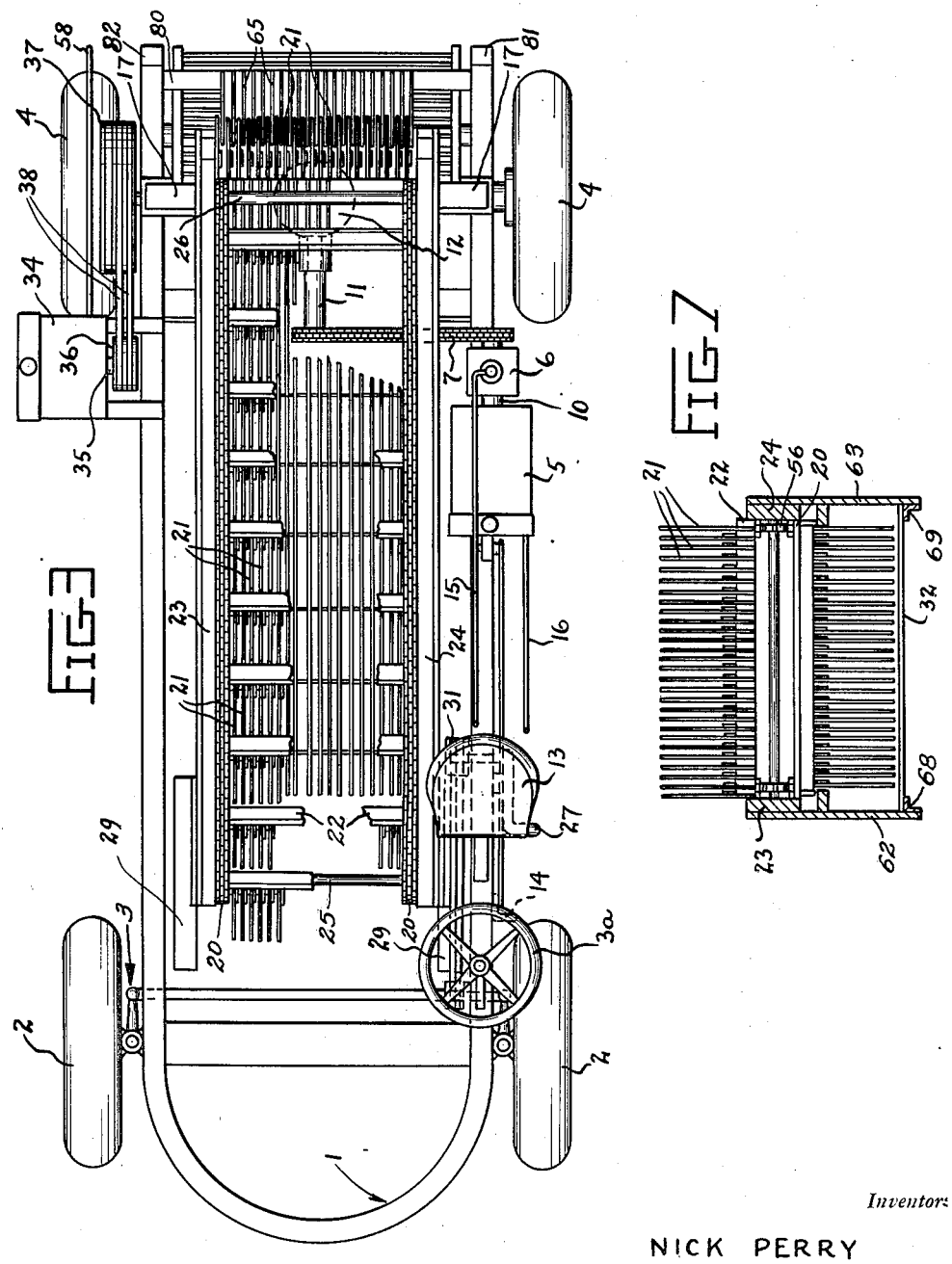

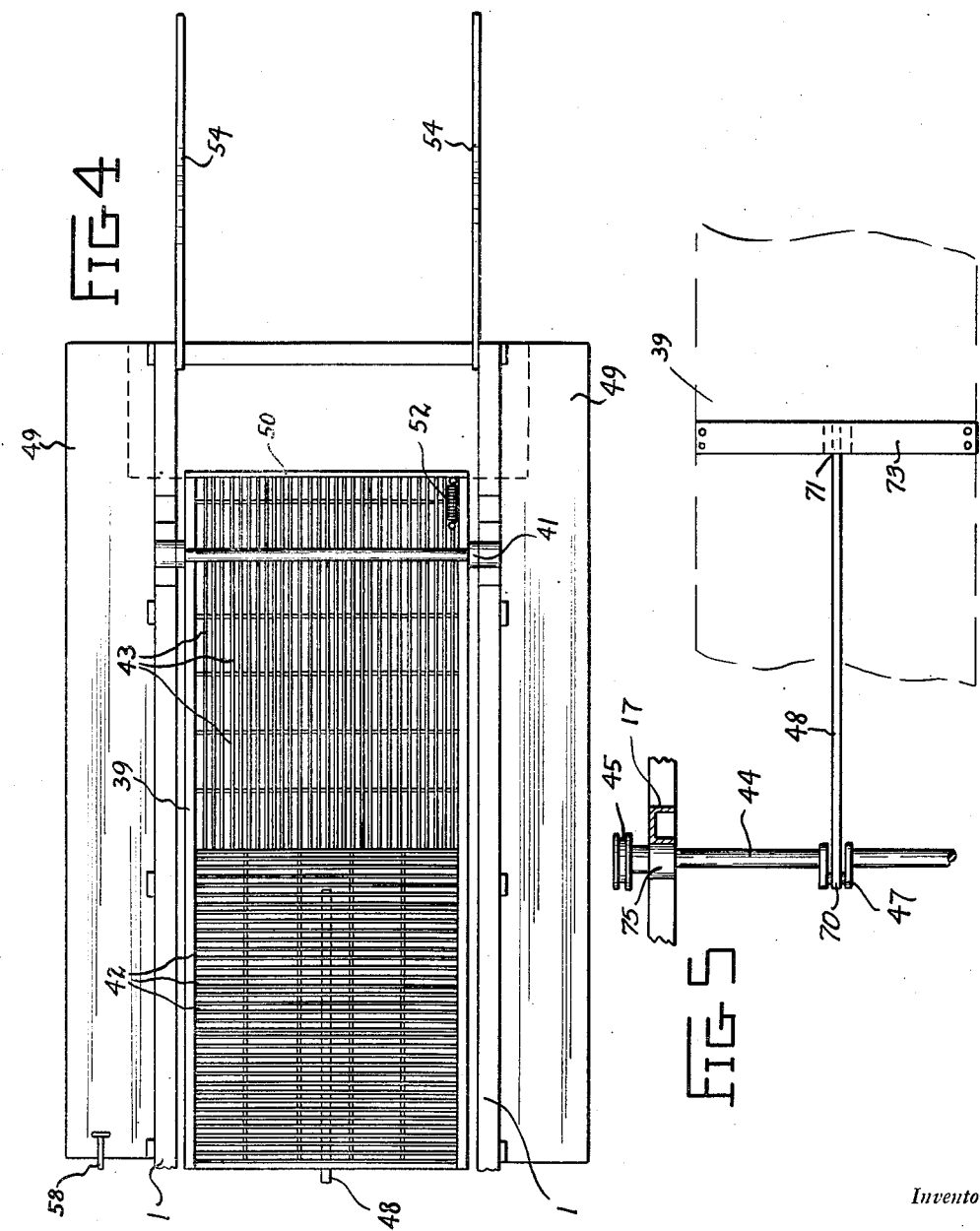

Patented Apr. 8, 1952

2,592,328

UNITED STATES PATENT OFFICE 2,592,328

ONION HARVESTING MACHINE

Nick Perry and Sylvester Schultz, Chicago Heights, Ill.

Application September 16, 1946, Serial No. 697,244

1 Claim. (Cl. 209—313)

This invention relates to improvements in onion harvesting machines.

An object of the invention is to provide an improved onion harvesting machine which will be power operated to scoop up onions from the ground and to convey them up a conveyor to be dropped into a reciprocating shaker for removing the dirt therefrom, after which the onions will be filled into boxes, which when full, will be slid down over a pair of guide rods or rails to the ground where the boxes will be later collected and removed to a suitable storage building.

Another object of the invention is to provide an improved onion harvesting machine supported upon an elongated frame mounted upon wheels and operated by a pair of engines, one engine being used for propelling the harvesting machine, and the other engine being connected with the onion pickup conveyor and shaker for operating the same.

A further object of the invention is to provide an improved onion harvesting machine which will be power propelled and operated, being steered by one man and providing means for two or more men to stand on a running board or platform disposed along the opposite rear sides of the machines while rubbing the onions over the shaker, and for filling boxes with the clean onions which when full will be slid down a pair of guide rails to the ground to be collected and stored.

Another object of the invention is to provide an improved onion harvesting machine which will be highly efficient in operation, and relatively inexpensive to manufacture and produce.

Other objects will appear as the description proceeds.

In the accompanying drawings which form a part of this application,

Figure 1 is a side elevation of the forward part of the improved onion harvesting machine;

Figure 2 is a side elevation of the rear portion of the improved onion harvesting machine;

Figure 3 is a plan view of the forward part of the improved onion harvesting machine;

Figure 4 is a plan view of the rear portion or end of the improved onion harvesting machine;

Figure 5 is a detailed plan view of the crank or eccentric operating means for the shaker;

Figure 6 is a view partially in section taken on line 6—6 of Figure 2, and

Figure 7 is a view taken on the line 7—7 of Figure 1.

Like characters of reference are used throughout the following specification and the accompanying drawings to designate corresponding parts.

In carrying out the invention, there is provided an improved onion harvesting machine having a substantially U-shaped supporting frame generally indicated by the reference numeral 1, the same being provided with the front wheels 2 which may be steered by means of the steering mechanism indicated generally at 3 and steering wheel 3a, and rear driving wheels 4 which are driven by means of the gasoline engine 5 which operates through the transmission mechanism 6 and driving chain 7 connected between the gears 8 and 9 secured respectively to the shafts 10 from the transmission and to the propeller shaft 11 connected with the usual differential 12.

The driver's seat 13 is suitably supported upon the frame 1 at the forward left-hand side thereof directly behind the steering wheel 3a, and is within reaching distance of the clutch pedal 14, and the levers 15 and 16 for respectively operating the gear shift and for operating the gasoline feed throttle to the engine.

Mounted upon the vertically extending stanchions 17 positioned directly above the rear axle of said machine, is the forwardly sloping conveyor mechanism generally indicated by the reference numeral 18. The conveyor 18 comprises a pair of chains 20 mounted on spur wheels 56 mounted on cross rods 25 and 26 which are journaled at opposite ends of the side frame members 23 and 24, cross members 22 are connected between the chains and carry conveyor forks 21 which cooperate with the screen 20 to convey onions dug up by blade 33 to the shaker 39. The lower forward end 66 of said conveyor 18 is suitably supported by the frame 1, and is provided with the adjusting screws 19 for tightening the endless conveyor chains 20 upon which the conveyor forks 21 are mounted in transversely extending rows, being secured to the cross members 22 secured to said chains. The conveyor mechanism 18 will be provided with the oppositely disposed parallel side frame members 23 and 24, which are secured together at their offset ends by means of cross rods 25 and 26 respectively, which are so arranged that the lower end of the conveyor may be raised and lowered as desired when the crank 27 is used to rotate a winch drum 31 operating a cable 28 secured to the shoes 29 supported at the lower end of said conveyor frame, said cable 28 being extended over the pulley 30 and over the drum 31. A ratchet wheel 60 will be secured to the drum 31 and will be locked in the desired position by means of a pivoted dog 61 associated therewith.

A conveyor screen 32 suspended from the side members 23 and 24 by depending plates 62 and 63 and secured to plates 62 and 63 by angles 68 and 69 (see Figure 7); underlies the conveyor 18 and is provided with a transversely extending knife 33 secured to the forward end 64 thereof, whereby when the harvestor is propelled along the rows of onions with the runner shoes 29 by the side of the row, the knife 33 will scrape up the onions onto the conveyor at which time the forks 21 of the conveyor will carry the onions upwardly to the upper end of said conveyor, and dump the same into a shaker mechanism hereinafter described.

The operating means for the conveyor and for the shaker mechanism comprises a second gasoline engine 34 which will be secured to the opposite side of the frame 1 from the engine 5, and will be provided with the crank shaft 35 on which the multiple groove pulley 36 is secured, said engine 34 having a throttle handle 58. A large multiple groove pulley 37 will be secured to the adjacent end of the transversely extending rod or shaft 26 mounted between the upper ends of the stanchions 17, and will be connected by means of the belts 38 with the smaller pulley 36 on the engine crank shaft 35. Since the conveyor 18 is connected directly with the transversely extending shaft 26, rotation of the large pulley wheel 37 will affect the operation of said conveyor.

Disposed at the rear end of the frame 1 is a reciprocable shaker generally designated by the reference numeral 39, being box-like and substantially rectangular in shape and supported upon the pivoted links 40 and 41 disposed respectively at the forward and rear ends of said shaker. The bottom of the shaker 39 is formed with a transversely extending grid rails 42 extending over its forward portion retarding the movement of the onions longitudinally of the shaker so that the onions are acted upon more efficiently and for a greater length of time, while the rear portions of the bottom of said shaker is formed with the longitudinally spaced grid rails 43. The shaft 44 is mounted transversely between the stanchions 17 by means of brackets 74 and 75 and connected with the large pulley 37 by means of the belt 46 which drives pulley 45 mounted on the end of shaft 44. Midway of the shaft 44 is provided a crank 47 which is connected by the eccentric pitman 48 one end 70 of which is journaled on the crank 47 and the other end 71 is journaled in a bracket 72 secured on cross-piece 73 of the bottom of the shaker 39, whereby when the engine 34 drives the large pulley 37, the small pulley 45 will also be rotated to operate the crank and pitman to reciprocate the shaker which is mounted upon a slight incline from its forward end to its rear end.

Running boards 49 are supported longitudinally of the frame 1 at the opposite sides thereof and provide means for two or more men standing upon the same while turning over the onions upon the shaker while the same is being reciprocated to further remove dirt from the onions. The rear end of the shaker 39 is provided with the pivoted end closure 50 which is pivoted or hinged at 51 and provided with the coil springs 52 attached to the closure 50 and to the side of the shaker 39 (see Figure 6) for normally holding the end gates or closure member 50 closed.

The men working upon the running boards of the machine will place a box 53 transversely of the frame immediately below the end gate 50, and from time to time will open the end gate permitting the clean onions to fall into the box until the same is completely filled, after which the end gate will be closed and the box will be slid downwardly upon the spaced longitudinally extending guide rods or rails 54 which are pivoted at 55 to the frame of the machine and are inclined downwardly to contact the surface of the ground, whereby when the boxes are filled to capacity, the same may be slid down the guide rods to the ground while the machine is in motion. The filled boxes of onions will be collected and transported to a suitable store house by separate means of conveyance.

From the foregoing description, it will be apparent that there has been devised and provided a highly efficient form of onion harvesting machine which will be power operated and self-contained, whereby as the machine is propelled along a row of onions the same will be scooped up by means of the knife blade at the forward end of the conveyor screen to be picked up by the transversely extending rows of spaced forks and carried upwardly along the conveyor to be dumped into the shaker mechanism positioned at the rear end of the machine. A plurality of fixed spaced forks 65 rigidly mounted on cross bar 80 will be supported transversely of the stanchions 17 by angle braces 81 and 82 rigidly secured to stanchions 17 whereby the forks 21 will pass between adjacent fixed forks to wipe off and remove any of the onions which stick in between the forks of the conveyor.

It will further be seen from the foregoing description, that three men may efficiently operate the improved onion harvesting machine, one man to do the driving and one man to stand on each running board to assist in the removal of the dirt from the onion and for the filling of the boxes and unloading of the same when filled to slide down the inclined guide rods or rails to the ground.

While the preferred embodiment of the instant invention has been illustrated and described, it will be understood that it is not intended to limit the scope of the invention thereto, as many minor changes in detail of construction may be resorted to without departure from the spirit of the invention.

Having thus described our invention what we claim as new and desire to secure by Letters Patent of the United States is:

In an onion harvesting machine, an elongated inclined shaker, means to oscillate said shaker, said shaker being box-like and having a pivoted panel closure at its lower end, an upper end portion of the bottom of said shaker comprising parallel spaced grid rails extending transversely of the shaker, and a lower end portion of the bottom of the shaker comprising a plurality of parallel spaced longitudinally extending grid rails.

NICK PERRY.
SYLVESTER SCHULTZ.

REFERENCES CITED

The following references are of record in the file of this patent:

UNITED STATES PATENTS

| Number | Name | Date |
|---|---|---|
| 23,988 | Parvin | May 10, 1859 |
| 267,959 | Wiltse | Nov. 21, 1882 |
| 386,384 | Conway | July 17, 1888 |
| 786,792 | Altstock | Apr. 11, 1905 |
| 791,369 | Richards et al. | May 30, 1905 |
| 1,085,162 | Rose | Jan. 27, 1914 |
| 1,199,696 | Hawley et al. | Sept. 26, 1916 |
| 1,439,266 | Shaw | Dec. 19, 1922 |
| 1,454,175 | Kovar et al. | May 8, 1923 |
| 1,494,458 | Campbell | May 20, 1924 |

(Other references on following page)

UNITED STATES PATENTS

| Number | Name | Date |
|---|---|---|
| 1,522,007 | Garner et al. | Jan. 6, 1925 |
| 1,647,717 | Perrone | Nov. 1, 1927 |
| 1,671,263 | Zuckerman | May 29, 1928 |
| 1,706,320 | Peter | Mar. 19, 1929 |
| 1,748,745 | Zuckerman | Feb. 25, 1930 |
| 1,892,495 | Vorthmann | Dec. 27, 1932 |
| 2,065,169 | Carpenter | Dec. 22, 1936 |
| 2,230,139 | Gustin | Jan. 28, 1941 |
| 2,288,238 | Goodall | June 30, 1942 |
| 2,331,520 | Urschel | Oct. 12, 1943 |
| 2,390,419 | Brown et al. | Dec. 4, 1945 |
| 2,438,500 | Hertzler | Mar. 30, 1948 |

FOREIGN PATENTS

| Number | Country | Date |
|---|---|---|
| 25,003 | Great Britain | Sept. 25, 1897 |
| 22,186 | Great Britain | Nov. 13, 1897 |
| 27,152 | Great Britain | 1902 |
| 111,690 | Australia | Oct. 17, 1940 |